United States Patent [19]
Marty et al.

[11] Patent Number: 5,860,634
[45] Date of Patent: Jan. 19, 1999

[54] RAMPED STEM EXTENDER

[75] Inventors: Garry Marty, Fishers, Ind.; Robert Bailey, London, Canada; Otto K. Allmendinger, Noblesville, Ind.

[73] Assignee: Masco Corporation of Indiana, Indianapolis, Ind.

[21] Appl. No.: 898,612

[22] Filed: Jul. 22, 1997

[51] Int. Cl.[6] .................................................. F16K 31/524
[52] U.S. Cl. .......................... 251/297; 251/288; 251/293
[58] Field of Search .................................... 251/297, 288, 251/293

[56] References Cited

U.S. PATENT DOCUMENTS

| 4,260,132 | 4/1981 | Habiger | 251/297 |
| 5,692,536 | 12/1997 | Tokarz | 251/288 X |
| 5,743,297 | 4/1998 | Mueller | 251/297 X |

*Primary Examiner*—John Rivell
*Assistant Examiner*—Meredith H. Schoenfeld
*Attorney, Agent, or Firm*—Myron B. Kapustij; Leon E. Redman

[57] ABSTRACT

A stem extender for use with a faucet valve assembly which contains a valve body, a valving member including a valve stem rotatably disposed in the valve body, a stop member including a detent and a bore non-rotatably mounted on the valve body with the valve stem extending through the bore, and a handle for rotating the valve stem and the valving member. The stem extender includes a tubular member having a camming surface which cooperates with the detent of the stop member to ensure that the valving member is rotated to a sufficiently open position to prevent so-called "temperature kick" which occurs when the valving member is in the only slightly open position. The tubular member includes a slot opposite the camming surface adapted to receive a compression spring. The stem extender includes extension member containing a bottom section which is non-rotatably disposed in the slot of the tubular member and a top section which includes a stem which is operably connected to the handle whereby rotation of the handle causes rotation of the stem extender and valving member.

10 Claims, 4 Drawing Sheets

5,860,634

RAMPED STEM EXTENDER

FIELD OF THE INVENTION

The instant invention relates to tub/shower valves of the type where one handle controls the temperature and the other handle controls the volume.

BACKGROUND OF THE INVENTION

The preferred configuration of a two handle pressure balanced tub/shower valve would have one handle controlling the temperature while the other controls the on/off and volume. There are currently no two handle pressure balanced tub/shower valves available due in part to the phenomenon of "temperature kick". Temperature kick occurs when the volume handle is throttled down to a low flow condition, typically less than about 0.15 gallons per minute. When this occurs, the pressure in the valve from the shut off to the inlets is approximately the same. If there is a pressure imbalance between the hot and cold water, for instance if the hot water is 5 psi greater than the cold water, the pressure at the outlet would be higher than the cold water inlet pressure as the hot water pressure would dominate the cold water pressure. At this point, the flow exiting the valve would be full hot water. In a short period of time, about one minute, the body and shower riser would be filled with hot water. When the valve is turned back on, there is a blast of hot water coming out of the shower.

The same situation could occur if the pressures are equal, but one of the inlet openings is almost full open while the other is almost completely shut off. If it were desired to shower at a water temperature of 110° F., when the cold water temperature is 50° F. and the hot water temperature is 120° F., the water opening would be almost totally biased to the hot water.

One way to prevent "temperature kick" is to ensure that the flow rate cannot be set at rates below about 0.15 gallons per minute. This is very difficult to achieve since most valves are infinitely adjustable across this range.

The present invention solves this problem by provision of a spring loaded stem extender which provides a "stop" and a ramped area which prevents extremely low flow rates.

SUMMARY OF THE INVENTION

The stem extender of the instant invention is adapted to be used with a valving member rotatably designed within a valve body. The valving member includes a valve stem that permits manual rotation of the valving member within the valve body. The stem of the valving member extends through a bore of a stop member. The stop member includes a detent extending from its top. The stem extender includes a tubular member having an annular flat surface on the bottom side and a central recess adapted to receive the valve stem. The tubular member has three ramped surfaces extending laterally from the detent. The ramped surfaces are engageable with the detent of the stop member upon rotation of the operating handle and, therefore, the stem extender which is operably connected to the handle at one end and to the stem of the valving member at the other end. Since the stop member is non-rotatably mounted on the valve body, rotation of the operating handle will cause rotation of the stem extender, the valve stem and the valving member.

As the handle is rotated to the on position a ramped surface of the stem extender rests on the detent of the stop member. A compression spring housed inside the tubular member applies a downwardly directed load that forces the ramped surface to ride down the detent thereby turning the handle and valving member to a further on position wherein the flow is 0.15 gallons per minute or more. Once the stop member detent comes to rest on the annular flat surface, the handle, stem extender and valving member stop rotating. At this point the flow rate is 0.15 gallons per minute or more.

DESCRIPTION OF THE PREFERRED EMBODIMENT

Figures 1, 2:
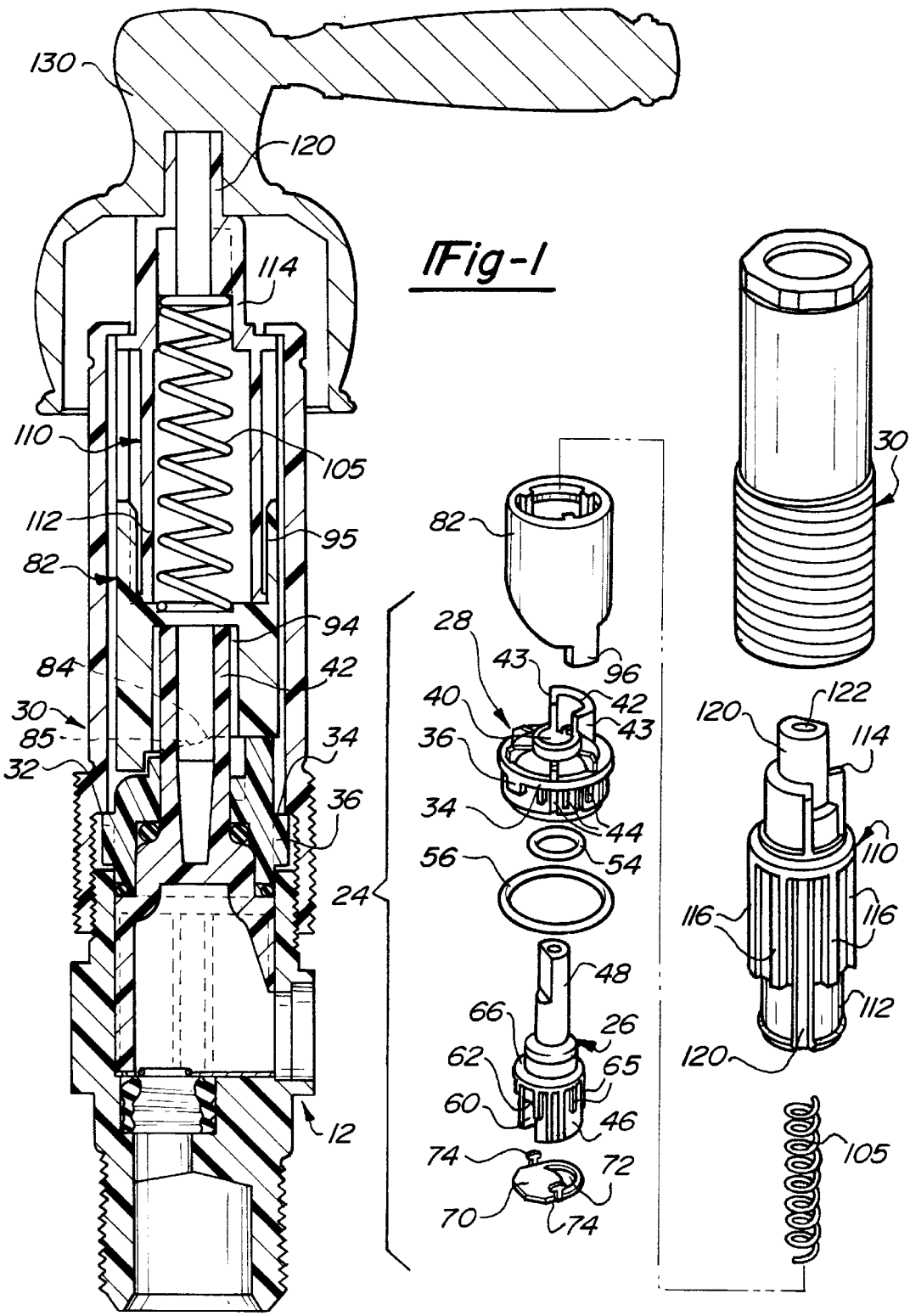
FIG. 1 is a vertical sectional view through a faucet valve embodying a valve assembly and the stem extender of the instant invention.
FIG. 2 is an exploded view of a valve assembly and stem extender of the instant invention.
Figure 3:
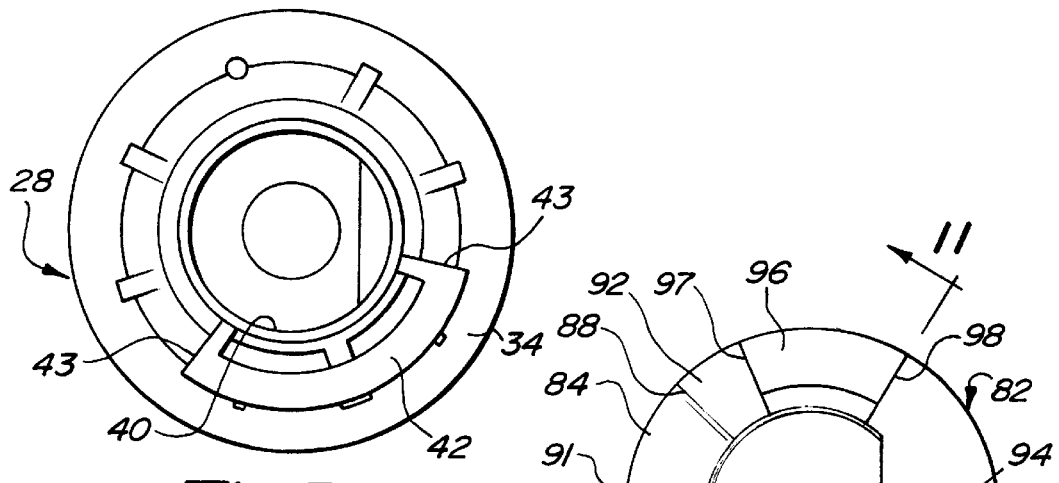
FIG. 3 is a top plan view of the stop member of the valve assembly.

In one embodiment, as illustrated in FIGS. 1 and 2, the valve assembly 24 generally comprises a valving member 26 and a stop member 28. The valve assembly 24 is secured within the valve body 12 by a collar 30 which is threadedly secured to the upper end of the valve body 12. A flange 32 of the collar engages the upper surface of a shoulder 34 formed on the stop member 28 so that when the collar 30 is tightened, the valve assembly 24 will be properly positioned within the valve body 12. A pair of positioning tabs 36 formed on the stop member 28 engage notches in the valve body 12 to ensure that the alignment of the valve assembly 24 within the valve body 12 is maintained.

Referring now to FIG. 2, the stop member 28 includes a central throughbore 40 adapted to receive the valving member 26. Integrally formed on the top of the stop member 28 is a detent member 42 having outer edges 43 which act as stop means to limit the rotational movement of the valving member 26. Preferably, the stop member 28 is an integrally formed plastic member having a plurality of ribs and grooves 44 extending axially below the shoulder 34. These ribs and grooves 44 are designed to reduce manufacturing costs by reducing the amount of material utilized to form the member 28. The ribs 44 extend outwardly to engage the interior wall of the valve body 12.

The valving member 26 includes fluid flow housing 46 and an operating stem 48 integrally formed therewith. The stem 48 of the valving member 26 extends through the bore 40 of the stop member 28. An inner O-ring seal 54 fits over the valve stem 48 and provides a fluid seal between the valve stem and the stop member 28. An outer O-ring seal 56 is seated within the groove formed between the stop member 28 and the valving member 26 in order to provide a fluid seal between the valve body 12 and the valve assembly 24.

As best shown in FIG. 2, the fluid flow housing 46, which is integrally formed with the valve stem 48 utilizing well known plastic molding techniques, at least partially defines an interior flow chamber 60 formed by a partial axial bore which is open to the bottom of the valving member 26. The housing 46 also includes a removed wall portion which defines the outlet passageway 62 of the flow chamber 60. As with the stop member, the housing 46 includes a series of axially extending reinforcement ribs 64 and 65. The ribs 64 extend from the bottom of the housing 46 to an annular shoulder 66 upon which the stop member 28 and O-ring 56 are seated while the ribs 65 extend from the shoulder 66 to a position short of the bottom of the valving member 26.

Secured to the bottom of the valving member 26 is a flow plate 70 having an aperture 72 formed therein. In the preferred embodiment of the flow plate 70, the aperture 72 has a substantially crescent shape and is offset from the center of rotation of the flow plate 70 and the valving member 26. Extending perpendicular to the flow plate 70 are at least two attachment tabs 74 adapted to detachably secure the plate 70 to the bottom of the valving member 26 thereby cooperating with the fluid flow housing 46 to form the flow chamber 60 and the outlet passage 62.

It is to be understood that the aforedescribed valve assembly is only one of the many valve assemblies with which the stem extender of the instant invention may be utilized. Generally, the instant stem extender may be utilized with any of the commonly known and used valve assemblies which have a stem and are rotatable in a housing from the open to the closed position.

Figure 4:
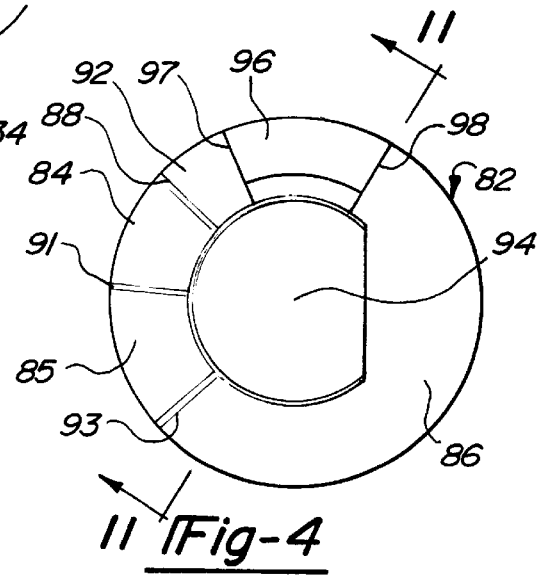
FIG. 4 is a bottom plan view of the tubular member of the stem extender.
Figure 5:
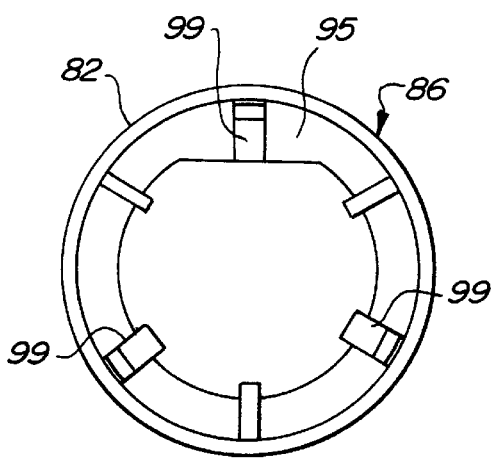
FIG. 5 is a top plan view of the tubular member of the stem extender.
Figure 6:
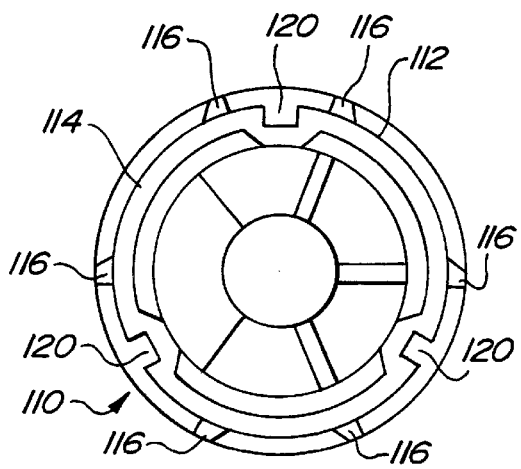
FIG. 6 is a bottom plan view of the extension member of the stem extender.
Figure 7:
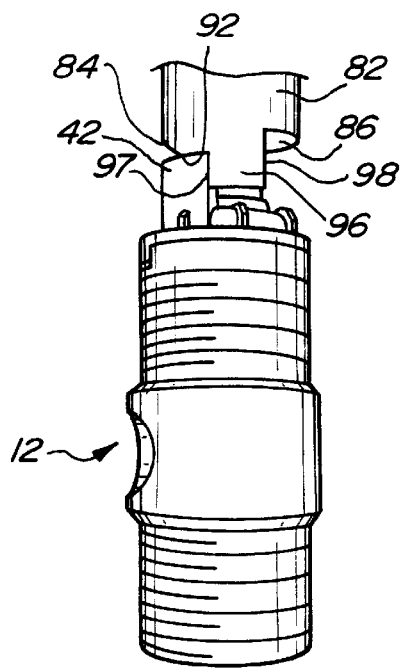
FIG. 7 is a fragmentary side elevational view of the tubular member of the stem extender and the stop member of the valve assembly which is mounted in a valve housing with the position of the stem extender relative to the top member when the valve is in the open position.
Figure 8:
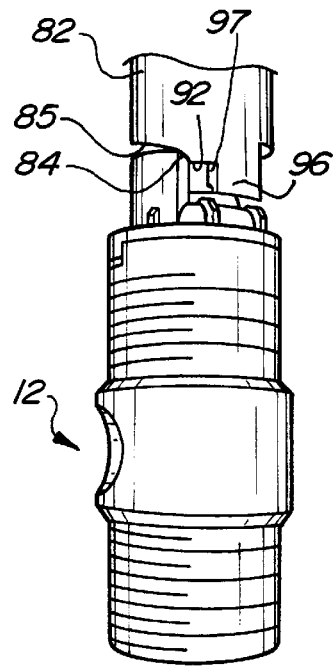
FIG. 8 is a fragmentary side elevational view similar to FIG. 7 but with the detent of the stoup member on the steep ramp and the valve in a slightly open position where the flow of water is less than about 0.15 gallons per minute.
Figure 9:
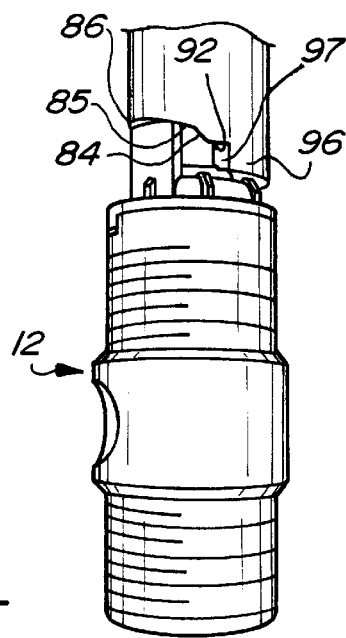
FIG. 9 is a fragmentary side elevational view similar to FIG. 7 but with the detent of the stop member on the shallow ramp and the valve in an open position where the flow of water is more than 0.15 gallons per minute.
Figure 10:
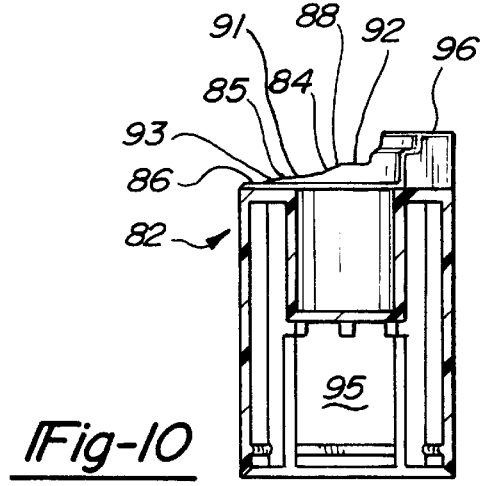
FIG. 10 is a sectional view of the tubular member of the stem extender showing the ramps of the tubular member.
Figure 11:
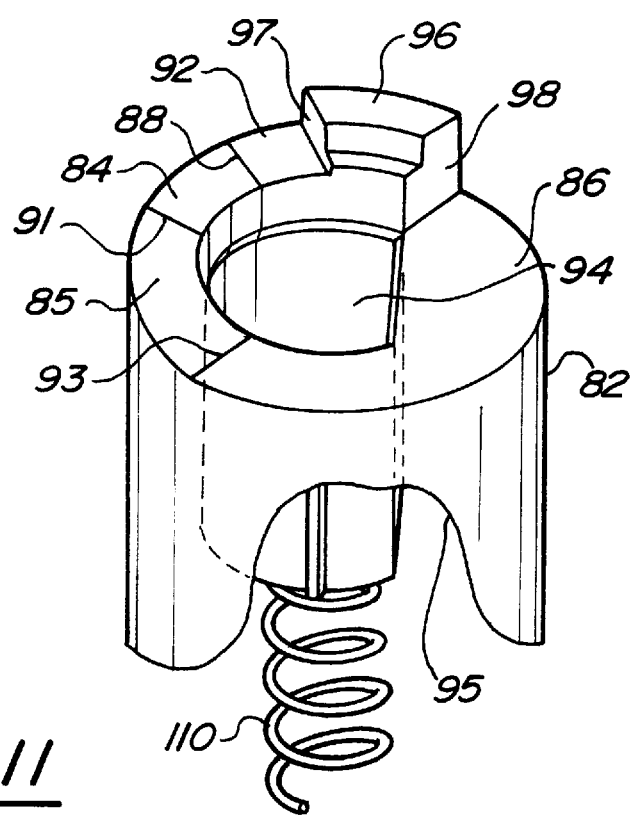
FIG. 11 is a partially cut away perspective view of the tubular member and spring.

As best illustrated in FIGS. 4, 10 and 11, the stem extender 80 includes a generally tubular member 82. Tubular member 82 has a generally annular shaped flat bottom surface 86. A detent member 96 having side edges 97 and 98 extends generally vertically from surface 86. In the embodiment illustrated in the Figures extending generally laterally from side edge 97 are three ramps or cam surfaces 92, 84 and 85. The ramps 92, 84 and 85 are each of different steepness, with ramp 84 being steepest and ramp 92 being shallowest. Ramp 92 has a steepness of about 5°, i.e., it is inclined at an angle of about 5° to flat surface 86. Ramp 85 has a steepness of about 15°, i.e., it is inclined at an angle of about 15° to flat surface 86. Ramp 84, the steepest ramp, has a steepness of about 450, i.e., it is inclined at an angle of about 45° to flat surface 86. The three ramps 84, 85 and 92 subtend an arc of about 85°, with ramp 92 subtending an arc of about 26°, ramp 84 subtending an arc of about 14° and ramp 85 subtending an arc of about 45°.

Extending laterally from side edge 97 is ramp 92 which is bounded on one side by side edge 97 and on the opposite side by ramp 84. Ramp 84 intersects ramp 92 at 88. At its opposite or bottom edge ramp 84 intersects ramp 85 at 91. Ramp 85 is not as steep as ramp 84 and intersects flat surface 86 at 93.

A recess 94 is disposed in the flat surface 86. Recess 94 has a complimentary shape to the stem 48 in order to non-rotatably receive stem 48. In the instant embodiment recess 94 is D shaped in order to accept the D shaped stem 48.

Tubular member 82 has a second recess 95 in the top thereof. This second recess 95 has a circular cross-section and is adapted to receive spring 110 therein. The interior of the wall of the second recess includes circumferentially spaced, axially extending ribs 99. In the instant embodiment there are three such ribs 99.

The ribs 99 slide into corresponding grooves 120 in the wall 114 of bottom section 112 of extension member 110. Extension member 110 includes a bottom section 112 and a top section 114. Bottom section 112 is of a generally circular cross-section and is adapted to fit snugly into second recess 95. A plurality of circumferentially spaced apart, axially extending ribs 116 are disposed on the outer surface of wall 114. These ribs 116, by engaging the lip 118 of second recess 95, serve to keep the bottom section 112 of extension member 110 from sliding all the way into the second recess 95.

The bottom section 112 is hollow in order to receive spring 110. The top section 114 includes a stem 120 which, in the embodiment illustrated, has a D shaped cross-section. The stem 120 has a bore 122 adapted to receive a screw 128 in order to connect an operating member or handle 130 to the upper end of the stem 120. The handle 130 is used to rotate the valving member 26 relative to the valve body in order to control the fluid flow through the valve.

The operation of the stem extender will now be described. In the off or closed position of the valve the detent member 42 rests on shallow ramp 92. As the valve is turned on, there is no water flow until the handle, and therefore the tubular member 82 of the stem extender 80 and the valving member 26, are rotated sufficiently so that the corner of the detent member 42 is aligned with the intersection 88 of the ramp 92 and the ramp 84. When this occurs, at approximately 28 degrees of rotation, the spring 105 with a compression load housed in recess 95 applies a downward load which will turn the handle, and consequently the valve, to the on position by forcing the detent 42 to ride down the ramp 84, the steepest ramp. The handle, and consequently the valve, will cease rotating when the detent 42 rests on the intersection 81 of ramps 84 and 85. At this point a minimum flow rate of about 0.5 gallons per minute is achieved.

If it is desired to turn the flow rate down during use the handle, and consequently the valve, is rotated clockwise. As the detent 42 reaches the intersection 81 of ramp 85 and ramp 84, the steepness of the angle of ramp 84 provides a "stop" that alerts the user not to rotate the handle any further. Continuing rotation of the handle clockwise for about the next 10 degrees will require the detent 42 to ride up on the ramp 84. The steepness of the angle of ramp 84 combined with the axial load provided by spring 110 will cause the handle, and consequently the valve, to rotate back to the on position, thereby keeping the flow about 0.5 gallons per minute if the handle is released.

The tubular member 82 includes three ramps that function as follows. Ramp 85 is shallow enough not to cause rotation, but does cause an increased load on the handle. The intent is to provide a difference in handle torque from "free" rotation when on the flat surface 86 to when the detent 42 hits the intersection 91 of ramps 85 and 84.

Ramp 84 is the working ramp. It is sufficiently steep so that, combined with the spring load, it causes rotation of the valve to a sufficiently open position so that a flow rate of 0.15 gallons per minute or less cannot be achieved.

Ramp 92 functions similarly to ramp 85. Both ramps 85 and 92 are not as steep as ramp 84 and are shallow enough not to cause rotation of the handle and valve. Ramp 85 does, however, provide an increased load on the handle. Absent ramp 85, as the handle is rotated to the off position, when the detent 42 reaches intersection 88 the torque to turn the handle is reduced which allows the handle to turn much more freely. This can result in a feel almost as though something broke inside the handle. Ramp 92 acts as a "friction brake" to improve the feel of handle rotation.

While the instant invention has been described with reference to a particular embodiment thereof, it will be readily understood that variations and modifications thereof may be made without departing from the spirit or scope of the instant invention.

What is claimed is:

1. A stem extender for a faucet valve assembly comprising a valve body, a valving member including a valve stem rotatably disposed in said valve body, a stop member including a detent and a bore non-rotatably mounted on said valve body with said valve stem extending through said bore, and a handle for rotating said valve stem, said stem extender comprising:

(i) a tubular member having a bottom side with a generally annular shaped first bottom surface surrounding a slot adapted to receive said valve stem, a detent member extending from said annular shaped surface, a camming surface extending laterally from said detent and intersecting said annular shaped surface, said camming surface adapted to engage said detent of said stop member; and a top side having a slot;

(ii) a compression spring adapted to fit into said slot in the top side of said tubular member; and (iii) an extension member comprising a bottom section and a top section, said bottom section being sized to fit into said slot in said tubular member and having a bore therein adapted to receive said compression spring, and said top section having a stem adapted to engage said handle.

2. The stem extender of claim 1 which includes at least one ramped surface intersecting said detent at one end and the first surface at the other end.

3. The stem extender of claim 2 which includes three ramped surfaces, one of the ramped surfaces being steeper than the other two ramped surfaces.

4. The stem extender of claim 2 wherein said at least one ramped surface is steep enough to cause rotation of said detent of said stop member.

5. The stem extender of claim 4 wherein said steep ramped surface intersects said surface at one end and a second ramped surface at the other end.

6. The stem extender of claim 5 wherein said second ramped surface intersects said steep ramped surface at one end and said detent surface at the other end.

7. The stem extender of claim 1 wherein said camming surface includes at least one steep ramped surface extending from adjacent said detent to said first surface.

8. The stem extender of claim 7 which includes at least three ramped surfaces, one of the ramped surfaces being steeper than the other two ramped surfaces.

9. The stem extender of claim 8 wherein said steep ramped surface intersects the other two shallow ramped surfaces at both ends.

10. The stem extender of claim 1 wherein said bottom section of said extension member has means to prevent rotation thereof in said slot in said tubular member.

* * * * *